(12) United States Patent
Xu et al.

(10) Patent No.: US 10,307,791 B2
(45) Date of Patent: Jun. 4, 2019

(54) LINEAR VIBRATOR

(71) Applicant: AAC Technologies Pte. Ltd., Singapore (SG)

(72) Inventors: Hongfu Xu, Shenzhen (CN); Xingzhi Huang, Shenzhen (CN); Jinquan Huang, Shenzhen (CN); Fanghua Ling, Shenzhen (CN)

(73) Assignee: AAC TECHNOLOGIES PTE. LTD., Singapore (SG)

( * ) Notice: Subject to any disclaimer, the term of this patent is extended or adjusted under 35 U.S.C. 154(b) by 204 days.

(21) Appl. No.: 15/659,017

(22) Filed: Jul. 25, 2017

(65) Prior Publication Data

US 2018/0297076 A1    Oct. 18, 2018

(30) Foreign Application Priority Data

Apr. 14, 2017    (CN) .................... 2017 2 0398117 U

(51) Int. Cl.
| | |
|---|---|
| *B06B 1/04* | (2006.01) |
| *H02K 35/02* | (2006.01) |
| *H02K 33/18* | (2006.01) |
| *H02K 33/16* | (2006.01) |
| *H02K 33/02* | (2006.01) |

(52) U.S. Cl.
CPC .............. *B06B 1/045* (2013.01); *H02K 33/02* (2013.01); *H02K 33/16* (2013.01); *H02K 33/18* (2013.01)

(58) Field of Classification Search
CPC ........ B06B 1/045; H02K 33/16; H02K 33/18; H02K 33/02

USPC .......................................................... 310/25
See application file for complete search history.

(56) References Cited

U.S. PATENT DOCUMENTS

| 8,253,282 | B2 * | 8/2012 | Park ...................... | H02K 33/16 310/25 |
| 8,258,657 | B2 * | 9/2012 | Kim ....................... | H02K 15/02 310/28 |
| 8,278,786 | B2 * | 10/2012 | Woo ...................... | H02K 33/16 310/15 |
| 8,410,642 | B2 * | 4/2013 | Dong ..................... | H02K 33/16 310/25 |
| 8,648,502 | B2 * | 2/2014 | Park ...................... | H02K 33/16 310/15 |
| 8,766,494 | B2 * | 7/2014 | Park, II ................. | H02K 35/02 310/25 |

(Continued)

*Primary Examiner* — Alex W Mok
(74) *Attorney, Agent, or Firm* — Na Xu; IPro, PLLC

(57) ABSTRACT

The present application provides a linear vibration motor, including a base, a vibrating unit and an elastic member. The elastic member includes a first elastic member and a second elastic member, the first elastic member includes a first fixing arm, two first elastic arms and two first connecting arms; the two first elastic arms bend and extend from two ends of the first fixing arm, respectively; the two first connecting arms bend and extend from the two first elastic arms, respectively; each of the first elastic member and the second elastic member is arranged in central symmetry with respect to a central axis which goes through a geometric center of the vibrating unit and perpendicular to the vibrating direction. As compared with relevant art, the linear vibration motor of the present application has advantages of simple and high-efficient assembling, good vibrating performance and high reliability.

10 Claims, 5 Drawing Sheets

(56) References Cited

U.S. PATENT DOCUMENTS

| | | | | |
|---|---|---|---|---|
| 9,024,489 B2* | 5/2015 | Akanuma | ............... | H02K 33/16 310/15 |
| 2009/0267423 A1* | 10/2009 | Kajiwara | ............... | H02K 33/02 310/36 |
| 2011/0127858 A1* | 6/2011 | Park | ............... | B06B 1/045 310/25 |
| 2011/0156500 A1* | 6/2011 | Dong | ............... | H02K 33/16 310/25 |
| 2011/0241451 A1* | 10/2011 | Park | ............... | B06B 1/045 310/25 |
| 2012/0032535 A1* | 2/2012 | Park, II | ............... | H02K 35/02 310/25 |
| 2012/0049660 A1* | 3/2012 | Park | ............... | B06B 1/045 310/25 |
| 2012/0169148 A1* | 7/2012 | Kim | ............... | H02K 33/16 310/25 |
| 2012/0187780 A1* | 7/2012 | Bang | ............... | H02K 33/16 310/25 |
| 2013/0221767 A1* | 8/2013 | Akanuma | ............... | H02K 33/02 310/15 |
| 2013/0229070 A1* | 9/2013 | Akanuma | ............... | H02K 33/00 310/25 |
| 2016/0181900 A1* | 6/2016 | Xu | ............... | H02K 33/16 310/12.27 |
| 2016/0181902 A1* | 6/2016 | Xu | ............... | H02K 33/16 310/17 |

* cited by examiner

LINEAR VIBRATOR

TECHNICAL FIELD

The present application relates to a vibration motor and, particularly, relates to a linear vibration motor applied in the field of mobile electronic products.

BACKGROUND

With the development of electronic techniques, portable consumable electronic products have become more and more popular, for example, cell phones, hand-held game players, navigation devices or hand-held multimedia entertainment equipment, etc. These electronic products generally adopt a linear vibration motor for systematic feedbacks, for example, incoming call prompt and message prompt of cell phones, navigation prompt, and vibrating feedback of game player, etc. Such a wild application requires the vibration motor to have excellent performance and longer service life.

A linear vibration motor in the relevant art includes a base having accommodating space, a vibrating unit located in the accommodating space, an elastic member which fixes and suspends the vibrating unit in the accommodating space, and a coil fixed at the base. A magnetic field generated by the coil and a magnetic field generated by the vibrating unit interact with each other, which drives the vibrating unit to move reciprocally and linearly so as to generate vibration.

However, in the relevant art, in order to increase elasticity of the elastic member of the linear vibration motor, two elastic members (a first elastic member and a second elastic member) are adopted, which intersect with each other and respectively clamp the vibrating unit. Each of the elastic members includes a first arm and a second arm which extend along opposite directions and are arranged in central symmetry, so that the first arms of the two elastic members intersect with each other and the second arms of the two elastic members intersect with each other, i.e., the first arm of the first elastic member is located above the first arm of the second elastic member, and the second arm of the first elastic member is located under the second arm of the second elastic member. Such structure is difficult and inefficient to assemble due to the cross arrangement.

Thus, it is necessary to provide a new linear vibration motor to solve the above-mentioned problem.

BRIEF DESCRIPTION OF DRAWINGS

Many aspects of the exemplary embodiment can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DESCRIPTION OF EMBODIMENTS

The present application is further illustrated with reference to embodiments and accompanying drawings.

Figure 1:
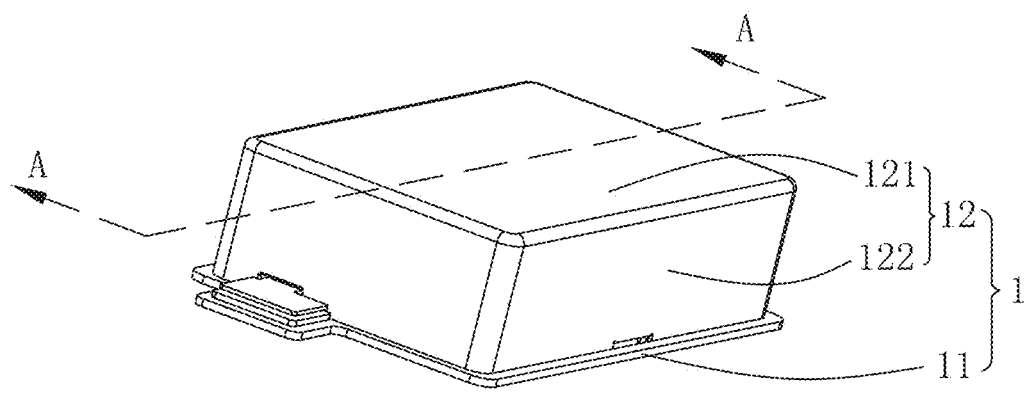
FIG. 1 is a perspective structural view of a linear vibration motor according to an exemplary embodiment of the present application.
Figure 2:
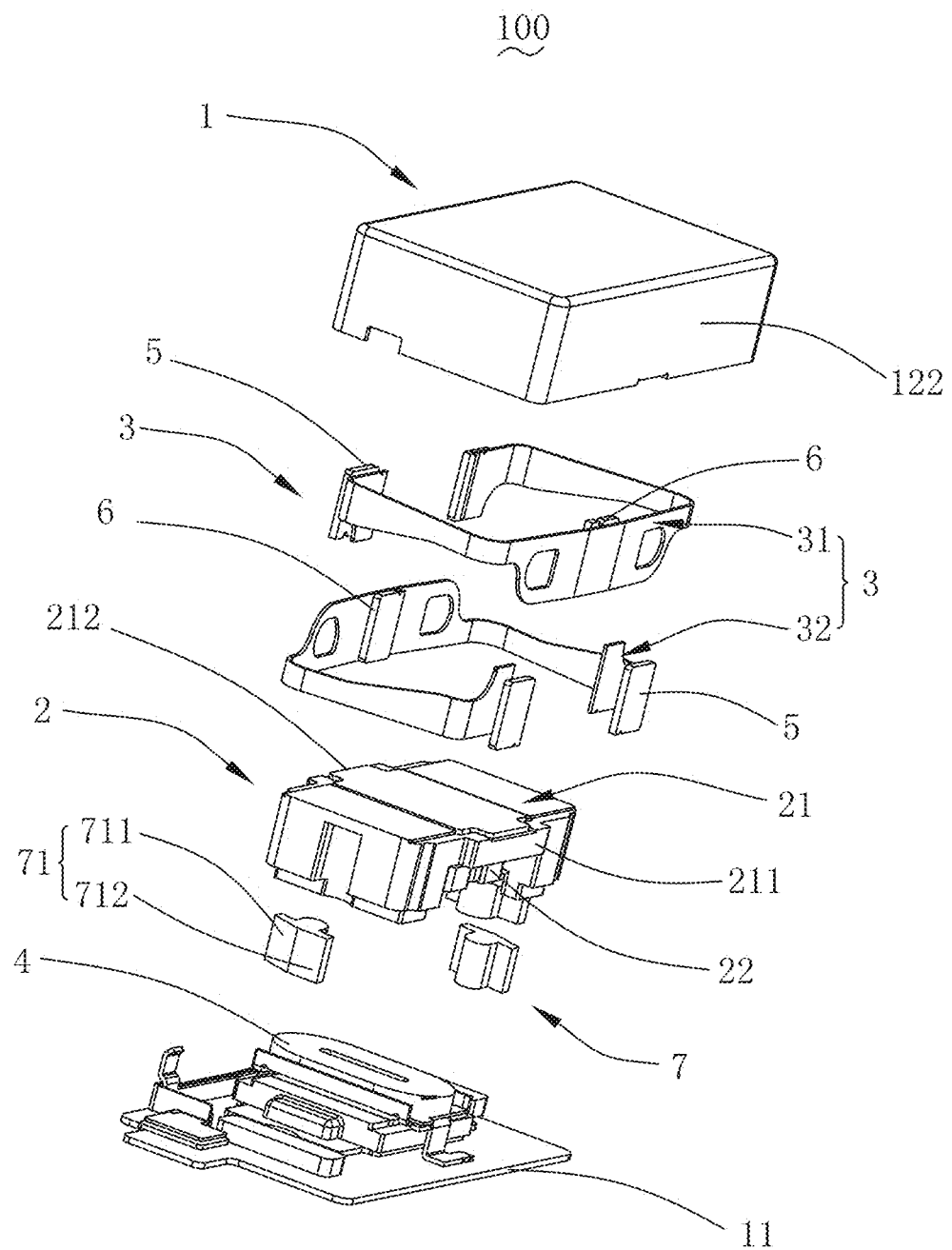
FIG. 2 is an exploded perspective structural view of a linear vibration motor according to an exemplary embodiment of the present application.
Figure 3:
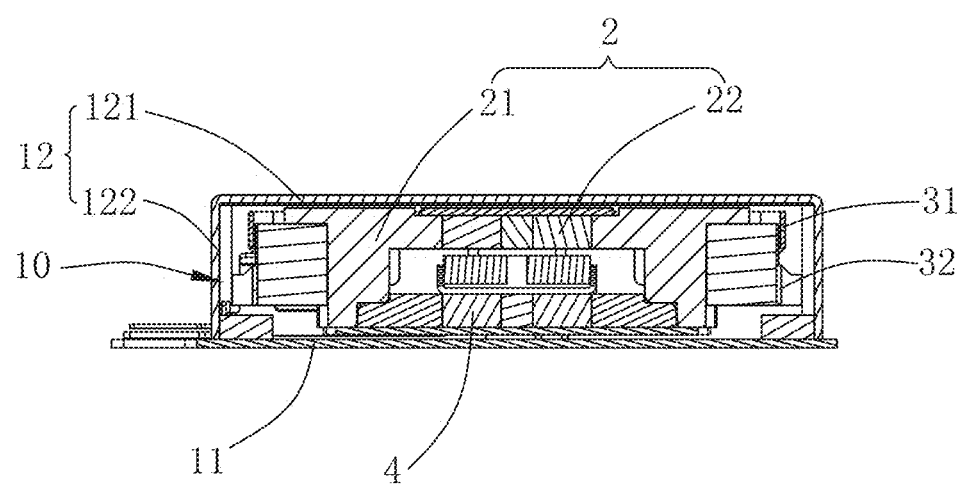
FIG. 3 is a sectional view of the linear vibration motor in FIG. 1 along line A-A.

With reference to FIGS. 1-3, FIG. 1 is a perspective structural view of a linear vibration motor according to an exemplary embodiment of the present application; FIG. 2 is an exploded perspective structural view of a linear vibration motor according to an exemplary embodiment of the present application; FIG. 3 is a sectional view of the linear vibration motor in FIG. 1 along line A-A. The present application provides a linear vibration motor 100, including a base 1 defining accommodating space 10, a vibrating unit 2 located in the accommodating space 10, an elastic member 3 configured to fix and suspend the vibrating unit 2 in the accommodating space 10, a coil 4 located at the base 1 and configured to drive the vibrating unit 2 to vibrate, a first block 5, a second block 6 and a position limiting boss 7.

The base 1 includes a bottom plate 11 and a cover 12 covering the bottom plate 11. The bottom plate 11 and the cover 12 cooperatively define the accommodating space 10.

The cover 12 includes a top plate 121 and a side plate 122. The top plate 121 is arranged opposite to the bottom plate 11, and the top plate 121 extends and bends toward the bottom plate 11 so as to form the side plate 122. In an exemplary embodiment, the base 1 is rectangular, and the side plate 122 is defined by four enclosing walls accordingly.

The vibrating unit 2 includes a weight 21 and a magnet 22 embedded in the weight 21. The vibrating unit 2 further includes a first side wall 211 and a second side wall 212 which are arranged opposite to each other along a direction perpendicular to a vibrating direction of the vibrating unit 2, i.e., the first side wall 211 and the second side wall 212 are located at two opposite sides of the weight 21, respectively.

Figure 4:
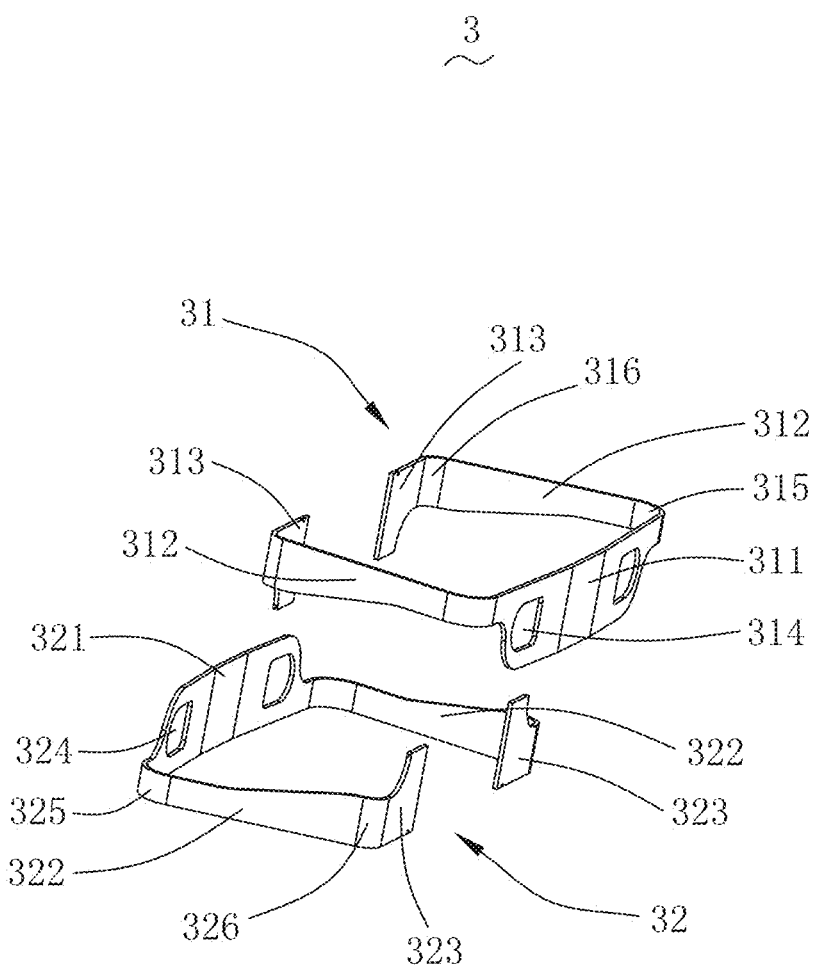
FIG. 4 is a perspective structural view of an elastic member of a linear vibration motor according to an exemplary embodiment of the present application.
Figure 5:
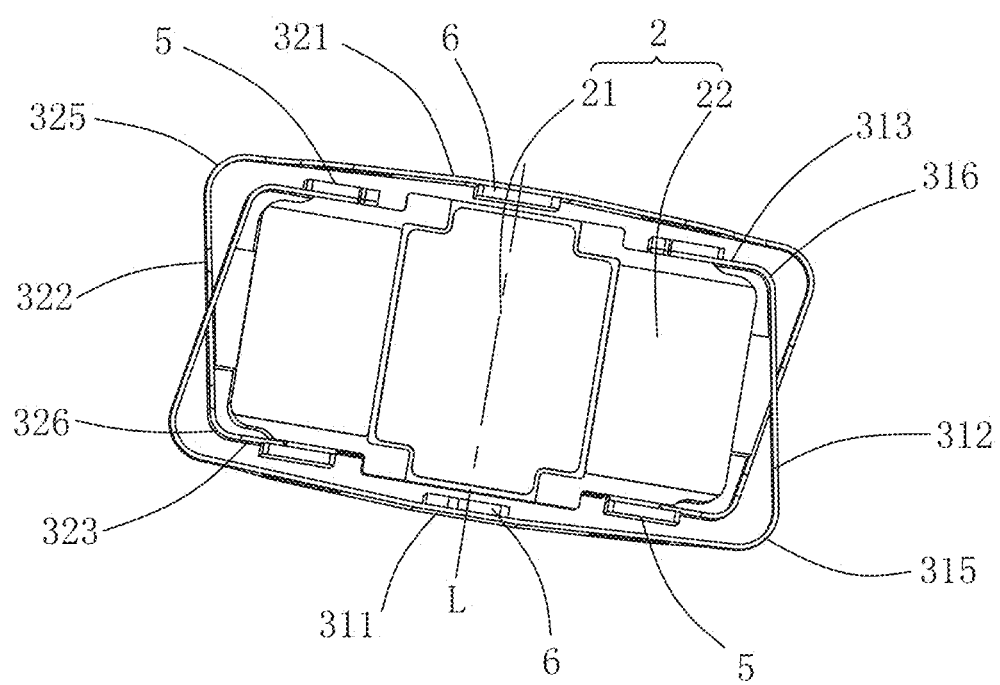
FIG. 5 is a structural schematic diagram of an assembling structure of a vibrating unit, an elastic member and a block of a linear vibration motor according to an exemplary embodiment of the present application.

With reference to FIGS. 4-5, FIG. 4 is a perspective structural view of an elastic member of a linear vibration motor according to an exemplary embodiment of the present application; FIG. 5 is a structural schematic diagram of an assembling structure of a vibrating unit, an elastic member and a block of a linear vibration motor according to an exemplary embodiment of the present application. The elastic member 3 includes a first elastic member 31 and a second elastic member 32 which are spaced from each other. The linear vibration motor 100 will have more balanced vibrating effect and better reliability as a function of the arrangement of double elastic members.

In an exemplary embodiment, the first elastic member 31 and the second elastic member 32 are structured in a same form, and the two give way to each other and are matched in opposite directions during assembling. The specific assembling manner is as follows:

The first elastic member 31 includes a first fixing arm 311, two first elastic arms 312 and two first connecting arms 313. The first fixing arm 311 is fixed at the base 1 and is arranged opposite to and spaced from the first side wall 211. The two first elastic arms 312 bend and extend from two ends of the first fixing arm 311 and around the vibrating unit 2, respectively. The two first connecting arms 313 bend and extend from two ends of the two first elastic arms 312 and around the vibrating unit 2, respectively.

The first fixing arm 311 is fixed at the side wall 122 of the base 1. In an exemplary embodiment, the first fixing arm 311 is fixed at the enclosing wall at a side of the side plate 122 adjacent to the first side wall 211. The two first elastic arms 312 are respectively located at two sides of the vibrating unit 2 along the vibrating direction thereof, and each first elastic arm 312 has a cross section gradually increasing along a direction from the first side wall 211 to the second side wall 212, so as to form an avoiding structure. The two first connecting arms 313 are respectively fixed at the second side wall 212, so as to suspend the vibrating unit 2 in the accommodating space 10.

The second elastic member 32 includes a second fixing arm 321, two second elastic arms 322 and two second connecting arms 323. The second fixing arm 321 is fixed at the base 1 and is arranged opposite to and spaced from the second side wall 212. The two second elastic arms 322 bend and extend from two ends of the second fixing arm 321 and around the vibrating unit 2, respectively. The two second connecting arms 323 bend and extend from two ends of the two second elastic arms 322 and around the vibrating unit 2, respectively.

The second fixing arm 321 is fixed at the side wall 122 of the base 1. In an exemplary embodiment, the second fixing arm 321 is fixed at the enclosing wall of the side plate 122 close to the second side wall 212. The two second elastic arms 322 are respectively located at two sides of the vibrating unit 2 along the vibrating direction thereof, and each second elastic arm 322 has a cross section gradually increasing along a direction from the second side wall 212 to the first side wall 211, so as to form an avoiding structure. The two first connecting arms 323 are respectively fixed at the first side wall 211, so as to suspend the vibrating unit 2 in the accommodating space 10.

Each of the first elastic member 31 and the second elastic member 32 is symmetrical with respect to a central axis L which goes through the geometric center of the vibrating unit 2 and is perpendicular to the vibrating direction of the vibrating unit 2, which simplifies the manufacturing of the first elastic member 31 and the second elastic member 32, so as to allow automatic assembling of the product and significantly improve the assembling efficiency.

Accordingly, the first elastic member 31 and the second elastic member 32 are assembled to be matched in opposite directions, and the first elastic arm 312 and the second elastic arm 322 give way to each other, so that the first elastic member 31 and the second elastic member 32 are spaced from each other with no crossing in space, so as to form an overlapping structure overlapping in opposite directions, which is simple to assemble and has high assembling efficiency.

In an exemplary embodiment, it is preferred that an included angle between the first fixing arm 311 and the first elastic arm 312 is an acute angle, an included angle between the first elastic arm 312 and the first connecting arm 313 is an obtuse angle, and the acute angle and the obtuse angle are supplementary angles with respect to each other; correspondingly, an included angle between the second fixing arm 321 and the second elastic arm 322 is an acute angle, an included angle between the second elastic arm 322 and the second connecting arm 323 is an obtuse angle, and the two are supplementary angles with respect to each other.

Further, in an exemplary embodiment, in order to guarantee that the first elastic member 31 and the second elastic member 32 can respectively extend and bend with sufficient amplitude around the vibrating unit 2 and generate large elasticity, a connection between the first fixing arm 311 and the first elastic arm 312 is an arc shaped transition which forms a first bending portion 315, and a connection between the first connecting arm 313 and the first elastic arm 312 is an arc shaped transition which forms a second bending portion 316; a connection between the second fixing arm 321 and the second elastic arm 322 is an arc shaped transition which forms a third bending portion 325, and a connection between the second connecting arm 323 and the elastic arm 322 is an arc shaped transition which forms a fourth bending portion 326.

The coil 4 is fixed at the bottom plate 11 and is directly facing the magnet 22, and the coil 4 is spaced from the magnet 22, and the magnetic field generated by the coil 4 after being energized interacts with the magnetic field of the permanent magnet 22, so as to drive the vibrating unit 2 to move reciprocally and linearly to generate vibration.

A plurality of first blocks 5 is provided and, specifically, in an embodiment, 4 first blocks 5 are provided. The first blocks 5 are fixed at sides of the first connecting arms 313 and the second connecting arms 323 which are respectively close to the base 1. The arrangement of the first blocks 5 can prevent the elastic member from directly impacting the base 1 while strengthening the fixing fastness and stability of the elastic member 3 and the vibrating unit 2 at the same time.

At least two second blocks 6 are provided, and the second blocks 6 are fixed at a side of the first fixing arm 311 close to the first side wall 211 and a side of the second fixing arm 321 close to the second side wall 212, respectively. The arrangement of the second blocks 6 can, on the one hand, prevent the weight 21 from directly impacting the elastic member and, on the other hand, strengthen the fixing fastness between the first fixing arms 311 and the side wall 122 of the base 1 and between the second fixing arms 321 and the side wall 122 of the base 1, so as to prevent the elastic member 3 from falling off the base 1.

Two position limiting bosses 7 are provided, which are formed by protruding and extending from two opposite sides of the vibrating unit 2 mutually spaced along the vibrating direction. The first elastic arm 312 and the second elastic arm 322 at the same side of the vibrating unit 2 are abutted with the same position limiting boss 7 at the same time when the vibrating unit is not vibrating.

Specifically, the position limiting boss 7 includes an abutting surface 71 located at a side of the position limiting boss 7 far away from the vibrating unit 2, and the abutting surface 71 includes a first abutting surface 711 and a second abutting surface 712 which are connected with each other and form an included angle therebetween. Preferably, the included angle between the first abutting surface 711 and the second abutting surface 712 is an obtuse angle. The first elastic arm 312 is abutted with the first abutting surface 711, and the second elastic arm 322 is abutted with the second abutting surface 712.

The arrangement of the position limiting bosses 7 can prevent the first elastic arms 312 and/or the second elastic arms 322 from fracturing due to overlarge amplitude of the vibrating unit 2, so as to guarantee normal working of the linear vibration motor 100 and improve stability and reliability thereof. The position limiting bosses 7 preferably adopts a damping material, for example, a position limiting boss made from rubber, etc.

Compared with relevant art, the linear vibration motor in the present application is configured that: the elastic member is surrounding the vibrating unit, the elastic member is configured to include a first elastic member and a second elastic member which are spaced from each other and in cross arrangement and which respectively fix the vibrating unit onto the base, so as to maximize the overall length and enhance the elastic performance of the elastic member, and improve the vibrating effect of the linear vibration motor; further, the first elastic member and the second elastic member are respectively structured in axial symmetry, so that the first elastic member and the second elastic member can be overlapped and fixedly mounted onto the vibrating unit, which simplifies the assembling and improves the assembling efficiency.

The above are merely embodiments of the present application, which are not intended to limit the protection scope of the present application, all equivalent structures or equivalent flow variations or direct/indirect application in other relevant technical fields made based on the contents of the description and drawings of the present application shall fall into the protection scope of the present application.

What is claimed is:

1. A linear vibration motor, comprising:
a base, the base defining accommodating space,
a vibrating unit, the vibrating unit being located in the accommodating space and comprising a first side wall and a second side wall which are opposite to each other along a direction perpendicular to a vibrating direction of the vibrating unit;
an elastic member, the elastic member being configured to fix and suspend the vibrating unit in the accommodating space and comprising a first elastic member and a second elastic member which are spaced from each other;
wherein the first elastic member comprises a first fixing arm, two first elastic arms and two first connecting arms; the first fixing arm is fixed at the base, and is opposite to and spaced from the first side wall; the two first elastic arms bend and extend from two ends of the first fixing arm and around the vibrating unit, respectively; the two first connecting arms bend and extend from two ends of the two first elastic arms and are fixed at the second side wall, respectively;
the second elastic member comprises a second fixing arm, two second elastic arms and two second connecting arms; the second fixing arm is fixed at the base, and is opposite to and spaced from the second side wall; the two second elastic arms bend and extend from two ends of the second fixing arm and around the vibrating unit, respectively; the two second connecting arms bend and extend from two ends of the two second elastic arms and are fixed at the first side wall, respectively;
each of the first elastic member and the second elastic member is arranged in central symmetry with respect to a central axis, and the central axis goes through a geometric center of the vibrating unit and is perpendicular to the vibrating direction of the vibrating unit.

2. The linear vibration motor as described in claim 1, wherein each first elastic arm has a cross section gradually increasing along a direction from the first side wall to the second side wall; and each second elastic arm has a cross section gradually increasing along a direction from the second side wall to the first side wall.

3. The linear vibration motor as described in claim 1, wherein an included angle between the first fixing arm and each first elastic arm is an acute angle, and an included angle between each first elastic arm and each first connecting arm is an obtuse angle; an included angle between the second fixing arm and each second elastic arm is an acute angle, and an included angle between each second elastic arm and each second connecting arm is an obtuse angle.

4. The linear vibration motor as described in claim 1, wherein a connection between the first fixing arm and each first elastic arm is an arc shaped transition which forms a first bending portion, and a connection between each first connecting arm and each first elastic arm is an arc shaped transition which forms a second bending portion; a connection between the second fixing arm and each second elastic arm is an arc shaped transition which forms a third bending portion, and a connection between each second connecting arm and each second elastic arm is an arc shaped transition which forms a fourth bending portion.

5. The linear vibration motor as described in claim 1, further comprising at least one pair of position limiting bosses;
wherein the at least one pair of position limiting bosses protrudes and extends from two opposite sides of the vibrating unit, respectively; and the two opposite sides of the vibrating unit are spaced from each other along the vibrating direction;
wherein one of the two first elastic arms and one of the two second elastic arms at a same side of the vibrating unit are abutted with a same position limiting boss at the same time when the vibrating unit is not vibrating.

6. The linear vibration motor as described in claim 5, wherein each position limiting boss comprises an abutting surface located at a side of the position limiting boss away from the vibrating unit; the abutting surface comprises a first abutting surface and a second abutting surface which are connected with each other and form an included angle; the one of the two first elastic arms is abutted with the first abutting surface, and the one of the two second elastic arms is abutted with the second abutting surface.

7. The linear vibration motor as described in claim 5, wherein the at least one pair of position limiting bosses are rubber-made bosses.

8. The linear vibration motor as described in claim 1, further comprising a plurality of first blocks, and the plurality of first blocks is fixed at sides of the first connecting arms and the second connecting arms close to the base.

9. The linear vibration motor as described in claim 1, further comprising at least two second blocks, wherein the at least two second blocks are fixed at sides of the first fixing arm close to the first side wall and/or sides of the second fixing arm close to the second side wall.

10. The linear vibration motor as described in claim 1, wherein the base comprises a bottom plate and a cover covering the bottom plate, the cover comprises a top plate which is arranged opposite to the bottom plate and a side plate which extends and bends from the top plate toward the bottom plate; and both the first fixing arm and the second fixing arm are fixed on the side plate.

* * * * *